Nov. 27, 1951  J. T. HINES ET AL  2,576,603
HOT WATER TANK

Filed June 17, 1946  2 SHEETS—SHEET 1

INVENTOR.
JUDSON T. HINES
BY JACK R. BALDWIN
Fred C. Matheny
ATTORNEY

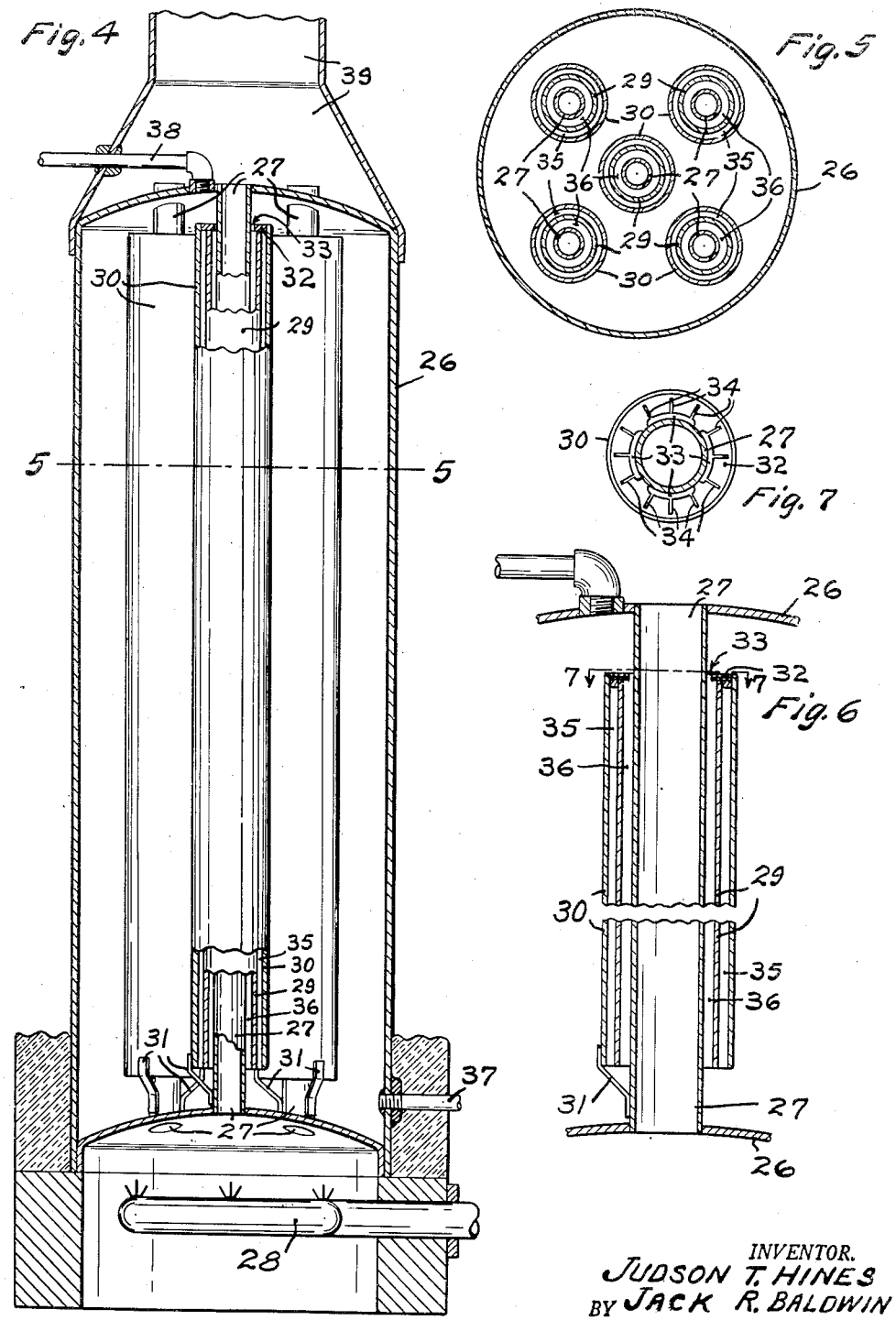

Patented Nov. 27, 1951

2,576,603

UNITED STATES PATENT OFFICE 2,576,603

HOT-WATER TANK

Judson T. Hines and Jack R. Baldwin,
Seattle, Wash.

Application June 17, 1946, Serial No. 677,136

9 Claims. (Cl. 219—38)

1

This invention relates to hot water tanks and an object of this invention is to provide water heating means, within a hot water tank, which will always deliver the water that is heated in the tank to the top portion of the tank where it is available for use.

Another object is to provide a hot water tank in which a limited supply of hot water will be available for use in a very short time after all of the hot water has been drawn out of said tank.

Another object of this invention is to provide water heating means that is especially well adapted for installation in hot water tanks of the fully automatic type.

Another object is to provide a hot water tank having therein a conduit forming an upright water circulation passageway or channel of relatively small cross sectional area, said passageway having a water inlet opening near the bottom of the tank and a water outlet opening near the top of the tank and said conduit being provided with means for heating the water therein.

Another object of this invention is to provide a hot water tank having an upright water heating conduit forming a channel of relatively small cross sectional area, and having, at the upper end of this conduit a hot water outlet opening of smaller area than the conduit, whereby the outlet of hot water will be restricted and the circulation through the conduit thereby slowed down so that the water in the conduit will be heated to a higher temperature than it would be if this outlet opening were not of smaller or restricted size, and to further provide, in a hot water tank of this type, simple and efficient means for preventing the said hot water outlet opening of smaller size at the top end of the water heating conduit from being obstructed by scale or like foreign matter.

In the use of automatic electric and gas hot water tanks it frequently happens that all of the hot water will be drawn out of the tank. The automatic water heating means for these tanks is usually arranged so that it will slowly heat up a relatively large body of water in the tank. In accordance with this mode of operation, after all of the hot water is drawn out of the tank, it will be a relatively long time before any more hot water will be available. It is an object of this invention to construct the water heating means within the tank so that it will operate continuously to heat a small stream of water and deliver this hot water to the upper portion of the

2 tank thereby providing a small amount of hot water which can be drawn off within a very short time after all of the hot water has been drawn out of the tank.

Other objects of this invention will be apparent from the following description taken in connection with the accompanying drawings.

In the drawings—

Fig. 4 is a view in vertical section with parts in elevation showing a hot water tank constructed in accordance with this invention and designed for use with a flame type heater such as a gas burner.

Fig. 5 is a view in cross section taken substantially on broken line 5—5 of Fig. 4.

Fig. 6 is a fragmentary view in vertical section of one of the water heating tubes shown in Fig. 4.

Fig. 7 is a sectional view with parts in plan taken on broken line 7—7 of Fig. 6.

Like reference numerals designate like parts throughout the several views.

Figure 1:
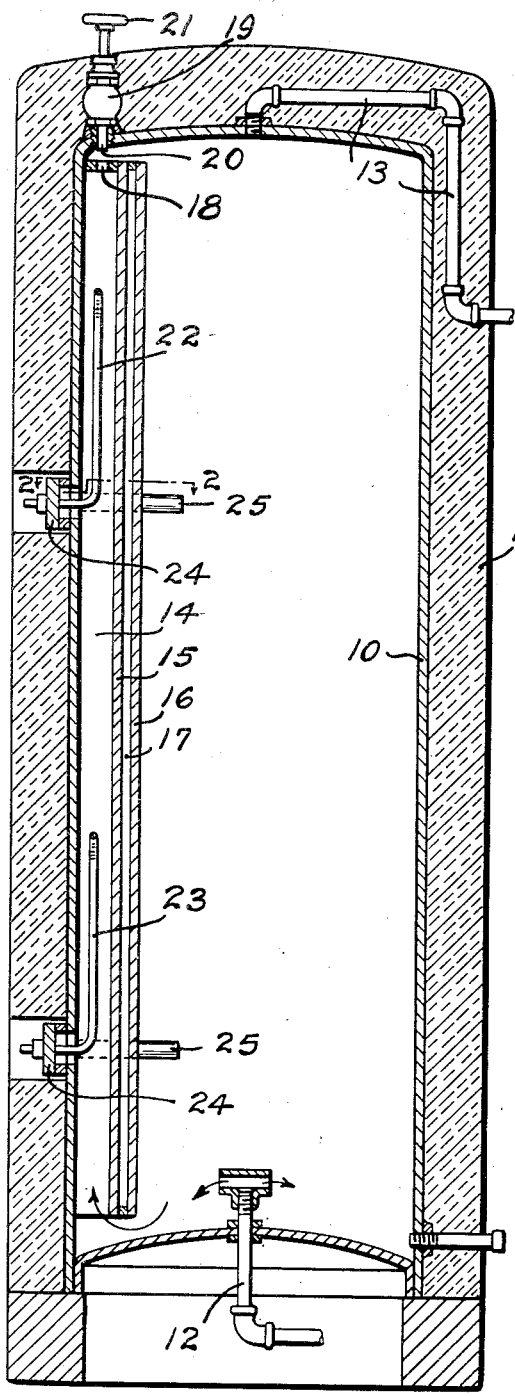
Figure 1 is a view in vertical section of an automatic electric hot water tank constructed in accordance with this invention.
Figure 2:
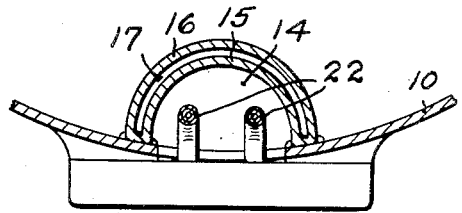
Fig. 2 is a fragmentary cross section on a larger scale than Fig. 1, taken substantially on broken line 2—2 of Fig. 1, showing a water conduit and electric water heating means in said conduit.

Figs. 1 and 2 show a water tank 10 enclosed in insulating material 11 and having a water inlet pipe 12 connected with its bottom portion and a water draw off pipe 13 connected with its top portion.

An upright water conduit 14 of relatively small cross sectional area is provided within the tank 10. Preferably this conduit 14 is of semi-circular cross section, as shown in Fig. 2, and consists of two spaced apart walls 15 and 16 having a dead air space 17 therebetween.

The conduit 14 extends from a point near the bottom of the tank 10 to a point near the top of said tank so that cold water can enter this conduit 14 at a location near the bottom of the tank 10 and hot water can be discharged from this conduit 14 at a location near the top of said tank 10.

The upper end portion of the conduit 14 is provided with an opening 18 of restricted area so that the water which is being heated in the conduit 14 can not discharge too fast and will be heated to a desired temperature before it is discharged from the conduit 14. Preferably the opening 18 is formed in a piece of material that scale and the like will not adhere to. This material may be heat resistant glass or porcelain that will withstand galvanizing temperatures and to which galvanizing will not adhere. Glass known commercially as "Pyrex" is satisfactory for this purpose.

If the opening 18 is formed in metal then preferably a plate of metal that will bend or flex under temperature changes is used, as hereinafter described, or means are provided for cleaning said opening in the event it becomes obstructed. One means for satisfactorily cleaning this opening 18 is to connect a valve housing 19 with the top wall of the tank 10 and to provide in said valve housing 19 a stem 20 that extends entirely through said valve housing and into the tank 10 and has a blunt or flat or concave lower end portion positioned so that it can be passed through the restricted opening 18 to push out any foreign matter therein and then retracted clear of said opening to leave the opening 18 unobstructed. The stem 20 is threaded in the valve housing 19 and has a hand wheel 21 positioned above the tank where it is readily accessible. The method of preventing the obstruction of the hot water outlet opening, such as opening 18, by scale or the like by the use of a bi-metallic plate which will flex or buckle when subjected to temperature changes is hereinafter described in connection with Fig. 6. It will be understood that this method is applicable to the structure shown in Fig. 1.

Any desired number of electric water heating elements 22 and 23 can be provided in the conduit 14 for the purpose of heating the water therein. Preferably two of these elements are provided. These water heating elements may be U-shaped immersion type heating elements which are of conventional shape except that said heating elements are bent at right angles so that the major portions of these elements will be longitudinally disposed in the conduit 14. Each heating element 22 and 23 is connected with the usual base means 24 that is secured to the exterior of the tank.

Preferably a thermostat 25 is provided within the tank 10 adjacent each heating element 22 and 23 and at one side of the conduit 14. Each thermostat is thus immersed in the water of tank 10 near the location of the heater it controls and is responsive to variations in the temperature of the water in the tank at this location but is not responsive to the temperature of the water in the conduit 14.

Figure 3:
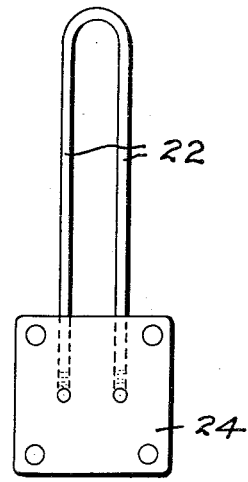
Fig. 3 is a detached view in front elevation of an electric water heater and mounting plate therefor.

In the operation of the water heater shown in Figs. 1, 2, and 3 movement of water in the conduit 14 will always be in an upward direction and the water that is heated in this conduit will always collect in the top of the tank 10 where it can be drawn off through the pipe 13.

If enough hot water is drawn off so that cooler water operates the lower thermostat 25 then the lower heating element 23 will be energized and cold water will be heated and the hot water delivered to the top of the tank until the lower thermostat is again immersed in warm water and de-energizes lower heating element 23.

If all of the hot water is drawn out of this tank then both of the water heating elements 22 and 23 will be energized and these elements will begin to heat water to a usable temperature and the same will quickly be delivered into the top of the tank 10 and is available for use.

In Figs. 4 to 7, inclusive a flame heated water tank 26 constructed in accordance with this invention is disclosed. The tank 26 has one or more flues or tubes 27 extending entirely through it from one end to the other which serve as conduits for the upward passage of heated gases. A flame type heater 28 is provided below the tank 26. Each flue 27 is disposed within a tubular jacket preferably formed of two spaced apart tubes 29 and 30 of different diameters. Each jacket 30 may be supported from the flue it surrounds by bracket means 31. The two tubes 29 and 30 of each pair are secured together in spaced apart sealed relation at their upper ends so as to provide a heat insulating dead air space 35 between said tubes and an annular water circulation space 36 between the tube 29 and the flue 27. Means is provided for restricting the outlet of hot water from the upper end of the annular space 36. The means shown in Figs. 6 and 7 for this purpose comprises an annular cap 32, which can be formed of heat resistant glass, but which is herein illustrated as formed of, preferably two, sheets of different metals that are secured together in face to face relation and are capable of flexing or warping when subjected to a change of temperature. This cap 32 fits over and rests against the flue 27 and the portion of the cap around the flue has recesses 33 forming a restricted outlet for hot water. Preferably slots 34 extend from the inner portion of the bi-metallic cap 32 outwardly toward the periphery thereof for the purpose of accentuating the flexing action of the inner portions of said cap under the influence of temperature changes. This flexing or warping action of the inner edge portions of the cap 32 will break loose and dislodge any scale or like matter that is deposited on this portion of the cap and by so doing will prevent obstruction of the restricted water outlet openings 33. The dead air space 35, shown in Figs. 4 and 6, is open at the bottom and closed at the top end. This has been found to be satisfactory because the water will trap air in the upper portion of this dead air space 35 and the water will only rise a short distance in said space 35. The dead air space 17 shown in Fig. 1 is sealed at both top and bottom so that water will be completely excluded therefrom. Obviously either of these dead air spaces can be filled with heat insulating material.

A water inlet pipe 37 communicates with the lower portion of the tank 26 and a water draw off pipe 38 communicates with the upper portion of said tank 26. A pipe 39 for the discharge of by-products of combustion is connected with the upper portion of the tank 26.

The structure shown in Figs. 4 to 7 operates in a manner similar to the structure shown in Figs. 1 to 3 to heat the water in the passageway 36 and deliver said heated water by gravity into the upper end of the tank 26. Thus the heat of the burner 28 is always being used to heat a small amount of water hot enough for use and all of the water that is thus heated is always available for use.

Figure 8:
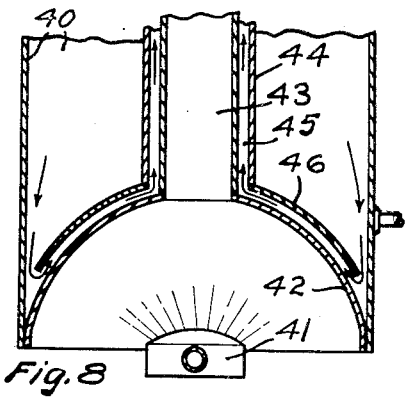
Fig. 8 is a fragmentary sectional view showing the lower end portion of a hot water tank of modified form adapted for use with a flame type heater.

Fig. 8 is a fragmentary cross sectional view showing the bottom end portion of a modified form of hot water tank 40 employing a flame type heater 41 underneath said tank. The bottom 42 of the tank 40 is of semi-spherical or inverted bowl shape and is connected with an axially disposed flue 43 through which hot gases pass upwardly.

The flue 43 is axially disposed within pipe 44 that cooperates to provide an annular water circulation space 45 around said flue.

A bell shaped member 46 is connected with the bottom end portion of the pipe 44 and supported close to but in spaced relation from the semi-spherical bottom 42 so that water in a thin layer entering under this bell shaped member 46 will be directed over the heated bottom 42 and will then pass upwardly in the annular space 45 around the flue 43. No heat insulating jacket is shown around the pipe 44 in Fig. 8 but it will be understood that a dead air space or other form of heat insulation can be provided around this pipe 44 if desired.

The operation of the water heater disclosed in Fig. 8 is similar to the operation of the water heater disclosed in Figs. 1, 2 and 3 in that the water is heated in the annular space 45 around the flue 43 and rises to the top of the tank as fast as it is heated and this hot water can be drawn off for use even though most of the water in the tank is cold.

Obviously changes in this invention may be made within the scope of the following claims.

We claim.

1. Water heating means comprising a tank; an upright conduit of relatively small cross sectional area in said tank; said conduit having a cold water inlet opening adjacent its lower end and a hot water outlet opening of restricted area adjacent its upper end; a longitudinally movable stem of a size adapted to snugly fit said outlet opening positioned in alignment with said outlet opening and movable into and out of said outlet opening; means operable from the exterior of the tank for longitudinally moving said stem to clean said outlet opening; and means for heating the water in said conduit.

2. Water heating means comprising a tank; an upright conduit member of substantially semi-cylindrical shape and of uniform size from end to end positioned within said tank with its concave side facing the wall of said tank and its edge portions in engagement with and permanently secured and sealed to the wall of said tank from end to end of said conduit member, said conduit member extending throughout the major portion of the length of said tank and said conduit member having adjacent its respective upper and lower ends two openings communicating with the interior of the tank; and water heating means disposed in said conduit between said two openings.

3. Water heating means comprising an upright cylindrical tank; a conduit member of semi-circular cross section having two spaced apart walls providing a dead air heat insulating space therebetween, said conduit being positioned within said tank with its concave side facing the side wall of said tank and said conduit extending lengthwise within said tank and having its edge portions secured to the side walls of said tank from end to end of the conduit to thereby form an upright water passageway of relatively small cross sectional area between said conduit member and the wall of the tank extending substantially from end to end of the tank, said passageway having an inlet opening at the bottom end of said conduit; means forming an outlet opening of restricted area at the upper end of said conduit; and an electric heating element protruding through the side of said tank and extending longitudinally in said passageway to heat water therein.

4. Water heating means comprising an upright tank; a conduit member extending lengthwise within said tank and cooperating with the wall of said tank to form an upright water passageway of relatively small cross sectional area, said passageway having a water inlet opening at the bottom end of said conduit; means forming a water outlet opening of restricted area at the upper end of said conduit; a plurality of electric heating elements extending through the side of said tank into said passageway in vertically spaced apart relation; and a thermostat extending into said tank alongside of said conduit and external to the conduit and adjacent each electric heating element and controlling the adjacent heating element.

5. Water heating means comprising a tank adapted to hold water; a flame type heater positioned below said tank; an upright conduit for heated gases from said heater extending through said tank; and a tubular member within said tank surrounding said conduit and spaced therefrom providing a water passageway of relatively small cross sectional area having a water inlet opening at the lower end of the conduit and a water outlet opening at the upper end of the conduit.

6. The apparatus as claimed in claim 5 in which the bottom of the tank is of inverted bowl shape and the lower end of the tubular member carries a member of inverted bowl shape positioned adjacent to but in spaced relation from said bowl shaped bottom.

7. Water heating means comprising a tank; an upright conduit within said tank having a cold water intake opening adjacent its lower end; a closure member at the upper end portion of said conduit having therein a hot water discharge opening of restricted area less than the cross sectional area of said conduit, said closure member being formed of non-scaling material whereby said restricted opening will remain open and unobstructed; and means for heating the water in said conduit.

8. Water heating means comprising a tank; an upright conduit within said tank having a cold water intake opening adjacent its lower end; a closure member at the upper end portion of said conduit having therein a hot water discharge opening of restricted area less than the cross sectional area of said conduit, said closure member being formed of heat resistant glass; and means for heating the water in said conduit.

9. Water heating means comprising a tank; an upright conduit within said tank having a cold water intake opening adjacent its lower end; a bi-metallic closure member at the upper end of said conduit having therein a hot water discharge opening of restricted area less than the cross sectional area of said conduit; slots in said closure member extending from said restricted opening outwardly; said closure member being adapted to flex under the influence of temperature changes to thereby prevent obstruction of said opening by dislodging scale that tends to collect on the closure member around the opening; and means for heating the water in said conduit.

JUDSON T. HINES.
JACK R. BALDWIN.

REFERENCES CITED

The following references are of record in the file of this patent:

UNITED STATES PATENTS

| Number | Name | Date |
|---|---|---|
| 1,034,952 | Ball | Aug. 6, 1912 |
| 1,202,957 | Baughn | Oct. 31, 1916 |
| 1,630,909 | Steere | May 31, 1927 |
| 1,743,573 | Shriner | Jan. 14, 1930 |
| 1,904,511 | Mutrux et al. | Apr. 18, 1933 |
| 1,916,861 | Hynes et al. | July 4, 1933 |
| 1,968,549 | Allen | July 31, 1934 |
| 2,032,125 | Gazelle | Feb. 25, 1936 |
| 2,307,061 | Morrow | Jan. 5, 1943 |
| 2,386,949 | Hayward | Oct. 16, 1945 |
| 2,411,675 | Alexander | Nov. 26, 1946 |